United States Patent
Smith, II (10) Patent No.: US 9,549,596 B2
(45) Date of Patent: Jan. 24, 2017

(54) MOLDABLE WALLET

(71) Applicant: Gladen G. Smith, II, Midlothian, TX (US)

(72) Inventor: Gladen G. Smith, II, Midlothian, TX (US)

(*) Notice: Subject to any disclaimer, the term of this patent is extended or adjusted under 35 U.S.C. 154(b) by 66 days.

(21) Appl. No.: 14/300,489

(22) Filed: Jun. 10, 2014

(65) Prior Publication Data

US 2015/0351506 A1 Dec. 10, 2015

(51) Int. Cl.
*A45C 1/06* (2006.01)

(52) U.S. Cl.
CPC ............ *A45C 1/06* (2013.01); *A45C 2001/065* (2013.01); *A45C 2001/067* (2013.01)

(58) Field of Classification Search
CPC ................. A45C 1/06; A45C 2991/065; A45C 2001/067; A45C 2001/065
USPC ............ 150/132, 137, 147; 206/37, 39, 39.5; 220/839
See application file for complete search history.

(56) References Cited

U.S. PATENT DOCUMENTS

| | | | | |
|---|---|---|---|---|
| 3,293,780 A * | 12/1966 | Cook | ............... | B42D 5/006 40/375 |
| 4,768,648 A * | 9/1988 | Glass | ............... | A45C 11/24 150/137 |
| 5,520,230 A * | 5/1996 | Sumner, III | ............... | A45C 1/06 150/137 |
| 5,725,098 A * | 3/1998 | Seifert | ............... | A45C 11/24 206/37 |
| 5,865,307 A * | 2/1999 | Friedman | ............... | A45C 13/1092 206/37.1 |
| 5,868,307 A * | 2/1999 | Calvert | ............... | B65D 77/2024 229/123.1 |
| 6,155,410 A * | 12/2000 | Davis | ............... | A45C 11/182 150/147 |
| 6,527,118 B2 * | 3/2003 | Rolland | ............... | B65D 83/0847 150/147 |
| 6,651,813 B2 * | 11/2003 | Vallans | ............... | A61B 50/362 206/365 |
| 7,475,816 B1 * | 1/2009 | Rochelo | ............... | A45C 11/18 206/308.1 |
| 7,830,672 B1 * | 11/2010 | Kitchen | ............... | A45C 11/182 174/350 |
| D672,952 S * | 12/2012 | Yang | ............... | D3/247 |
| 2006/0076094 A1 * | 4/2006 | Kaminski | ............... | A45C 11/182 150/147 |
| 2007/0194128 A1 * | 8/2007 | Coe | ............... | A45C 11/00 235/486 |
| 2007/0205115 A1 * | 9/2007 | Lee | ............... | A45C 11/00 206/37 |

(Continued)

FOREIGN PATENT DOCUMENTS

| | | | | |
|---|---|---|---|---|
| FR | 2644681 A1 * | 9/1990 | ............. | A45C 15/00 |
| FR | 2654081 A1 * | 5/1991 | ............. | B65D 83/12 |

*Primary Examiner* — Sue A Weaver
(74) *Attorney, Agent, or Firm* — Braxton, Hilton & Perrone, PLLC (57) ABSTRACT

A system and method for a moldable wallet. A moldable wallet has a clam shell shape with a top shell coupled to a bottom shell by a shell hinge. The wallet comprises a sealed side located at the shell hinge, and a clamped top side, right side, and bottom side. The top shell and the bottom shell have a moldable material, which can be a thermoplastic material or other bendable or moldable metal. The wallet can further include a money clip which can be integral with the wallet or a separate piece.

11 Claims, 4 Drawing Sheets

(56) References Cited

U.S. PATENT DOCUMENTS

| | | | | |
|---|---|---|---|---|
| 2009/0045091 A1* | 2/2009 | O'Neill | ............ | A45C 1/06 |
| | | | | 206/449 |
| 2013/0025750 A1* | 1/2013 | Wingerter | ............ | A45C 1/02 |
| | | | | 150/149 |
| 2013/0256160 A1* | 10/2013 | Ore-Yang | ............ | A45C 11/00 |
| | | | | 206/37 |
| 2014/0090990 A1* | 4/2014 | Richardson | ............ | G06F 1/1626 |
| | | | | 206/37 |
| 2014/0183056 A1* | 7/2014 | Umimoto | ............ | C25B 1/26 |
| | | | | 205/556 |

* cited by examiner

MOLDABLE WALLET

BACKGROUND OF THE INVENTION

Technical Field

The present invention relates to a system and method for manufacturing a wallet.

Description of Related Art

Wallets are used for storing money, credit cards, etc. Typically, wallets are manufactured from leather or other similar material. Such material easily wears, stretches, and scoffs. Consequently, there is a need for an improved wallet.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
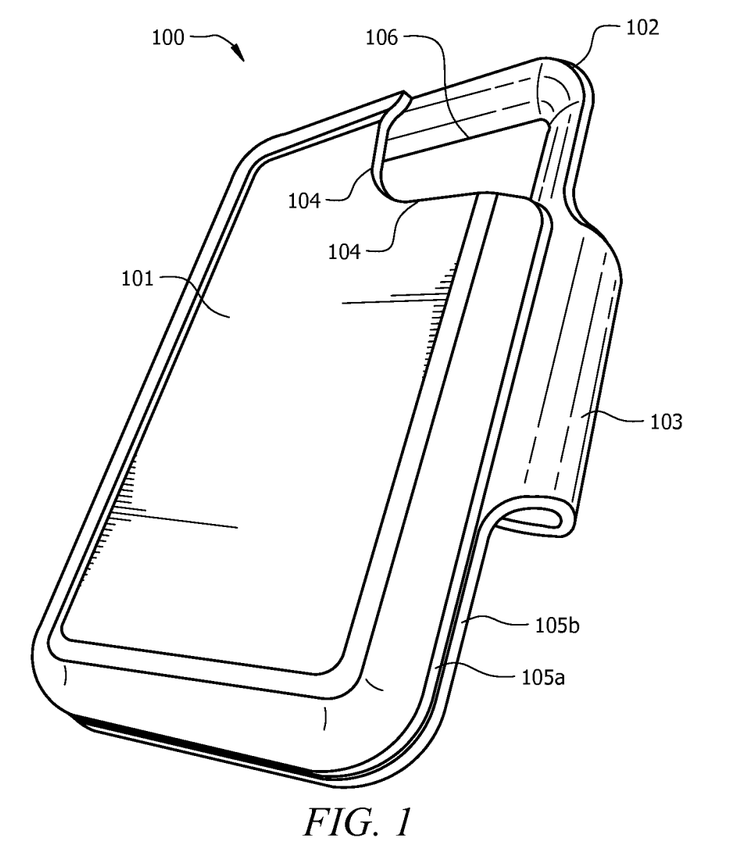
FIG. 1 is a top perspective view of a wallet in one embodiment.

FIG. 1 is a top perspective view of a wallet in one embodiment. In one embodiment the wallet comprises any moldable material. A moldable material is any material which is moldable and which, when set, comprises a hard and rigid material which retains the set shape. In one embodiment the moldable material is water resistant. In one embodiment the wallet comprises any bendable metal or thermoplastic material. The wallet can include, but is not limited to, carbon-fiber, titanium, aluminum, bendable metals, and thermoplastic materials. A thermoplastic material is a polymer which becomes moldable above a specific temperature and which returns to a solid state upon cooling. Virtually any thermoplastic material, including acrylics, polyvinyl chlorides, and others can be utilized. In one embodiment Kydex® manufactured by Kydex LLC of Bloomsburg, Pa. is utilized. Kydex is a thermoplastic acrylic-polyvinyl chloride which is often used in the airline industry.

Figure 2:
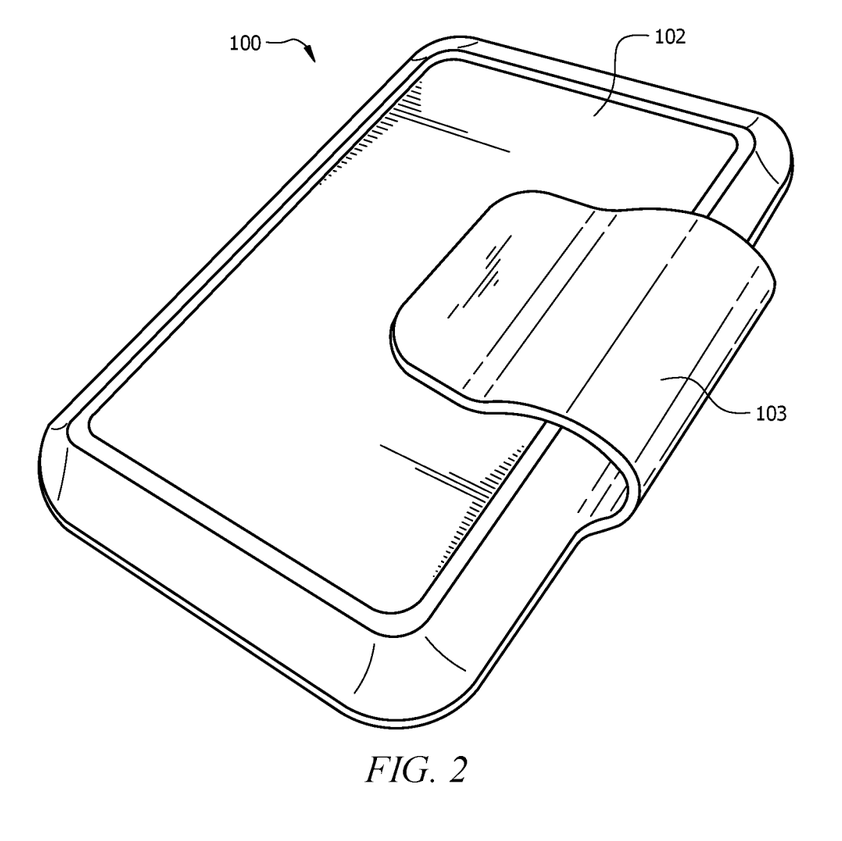
FIG. 2 is a bottom perspective view of a wallet in one embodiment.

As used herein, a wallet refers to an object which is used to store money, credit cards, identification cards, etc. In one embodiment, discussed herein, the wallet 100 comprises a clam shell with a top shell 101 and a bottom shell 102. FIG. 2 is a bottom perspective view of a wallet in one embodiment. The bottom shell 102 is better viewed in FIG. 2.

Figure 3:
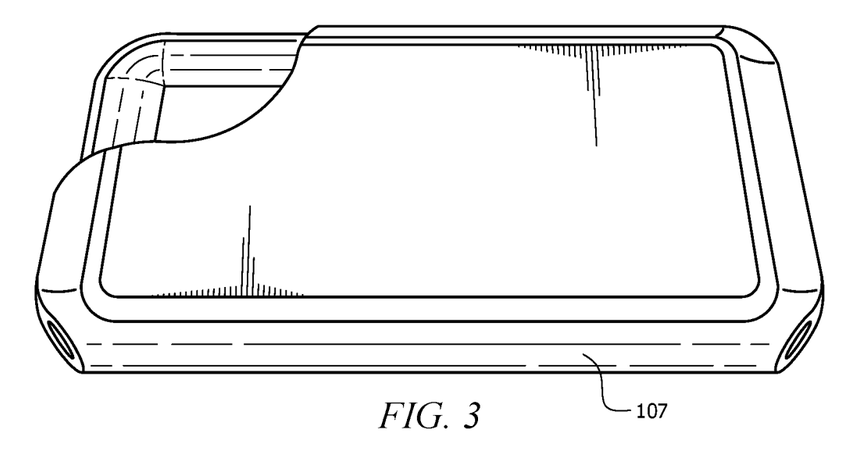
FIG. 3 is a back perspective view of a wallet in one embodiment.

The top shell 101 and the bottom shell 102 meet at a shell hinge 107. The shell hinge 107 is best seen in FIG. 3, which is a back perspective view of a wallet in one embodiment. The shell hinge 107 couples the top shell 101 and the bottom shell 102. The shell hinge 107 is the pivot point at which the top 101 and bottom shells 102 meet and can be separated. Thus, if a user applies an upward force onto the top shell 101, keeping the bottom shell 102 immobile, the top shell 101 will pull away relative to the bottom shell 102, pivoting at the back hinge 107.

The back hinge 107 can comprise virtually any hinge known in the art which will allow the top shell 101 to pivot relative to the bottom shell 102, and vice versa. In one embodiment, the top shell 101, the bottom shell 102, and the shell hinge 107 are integrally made from a single piece of moldable material. In such embodiments the shell hinge 107 couples the top shell 101 to the bottom shell 102 and the thermoplastic properties of the shell hinge 107 allow it to operate as a hinge. In one embodiment, the shell hinge 107 also acts as a sealed rear side of the wallet. Returning to FIG. 1, it can be seen that the wallet comprises three clamped sides, the top side, the front side on the right, and the bottom side. The shell hinge 107 comprises a sealed rear side on the left of FIG. 1. A clamped side refers to a side through which contents can be inserted or retrieved. Conversely, a sealed side refers to a side through which contents cannot be inserted or retrieved. A sealed side is permanently sealed during traditional usage whereas a clamped seal can be opened during traditional usage. It can be seen that a card, for example, can be inserted or retrieved from the right front side of the wallet by spreading the top shell 101 from the bottom shell 102. However, the top shell 101 cannot be spread from the bottom shell 102 at the closed back side. Consequently, the wallet 100 depicted in FIG. 1 comprises three clamped sides and one sealed side. While the shell hinge 107 is depicted on being located on the rear side on the left of FIG. 1, this is for illustrative purposes and should not be deemed limiting. The shell hinge 107 can be located on any side of the wallet 100. For example, the shell hinge 107 can be located on the top side, the bottom side, the left side, or the right side.

As seen in FIG. 1, in one embodiment the top shell 101 comprises a window 104. A window, as used herein, is an area through which the wallet's contents can be viewed, and/or gripped. The window 104 can be located on the top shell 101, the bottom shell 102, or both. In one embodiment, and as depicted, the window 104 is located on the upper right corner of the top shell 101. Such a placement allows the wallet's 100 contents, such as cards, to be viewed and retrieved as will be discussed in more detail below.

The window 104 can comprise a dissimilar transparent material, or, as depicted, the window 104 comprises a void or absence of material. Thus, as depicted, the window 104 comprises a cut-away portion in the top shell 101 located on the upper right corner of the top shell 101.

As seen in FIGS. 1 and 2, the wallet 100 depicted further comprises a money clip 103. As depicted the money clip 103 comprises the same material as the top shell 101 and bottom shell 102. Thus, in one embodiment the top shell 101, the bottom shell 102, the shell hinge 107, and the money clip 103 comprise one integral piece formed from the same sheet of material, discussed in more detail below. A money clip 103 allows money, cards, or other items to be stored on the external surface of the wallet 100. In one embodiment, for example, cards such as credit cards or driver's license are stored within the internal compartment of the wallet 100 between the top shell 101 and the bottom shell 102 whereas money is stored on the external surface of the wallet 100 underneath the money clip 103. The money clip 103 maintains its contents by friction and the force induced to the moldable material as it attempts to retain its shape. When the money clip 103 is stretched open to insert, for example, money, the money clip 103 urges forward to retain its set-shape adjacent to the bottom shell 102. The memory, or set-shape, of the money clip 103 provides the friction and force necessary to retain the money beneath the money clip 103. The same memory or set-shape also helps the shell hinge 107 attempt to retain its shape.

In one embodiment, however, the money clip 103 is not integrally made with the top 101 and bottom shells 102. Instead, in other embodiments the money clip 103 is a separate piece which is added to the wallet 100. The separate piece can comprise a wire, polymer, or virtually any material which can be coupled to the wallet 100 and function as a money clip 103. The separate piece can comprise any material discussed above. In one embodiment the separate material comprises the same material as the wallet, whereas in other embodiments the separate piece comprises a dissimilar material as the wallet. In one embodiment the separate piece comprises titanium or tensile steel. Having a removable money clip 103, in one embodiment, is an advantage in that users can customize their wallet to fit their needs. If they do not utilize a money clip 103, they can remove the money clip 103, resulting in a slightly thinner wallet.

Returning back to FIG. 1, FIG. 1 shows a recess 106. A recess 106 in an indention in the top shell 101, the bottom shell 102, or combinations thereof, which provide storage for the wallet 100. A deeper recess 106 provides for more storage in the wallet 100. In one embodiment the recess 106 has a shape substantially similar to a standard credit card. The thickness of the recess 106 can vary and ranges from about $1/16$ of an inch to about $1/32$ of an inch for a total void of between about $1/8$ of an inch to about $1/16$ of an inch. In one embodiment both the top shell 101 and the bottom shell 102 comprise a recess 106 which mates to form the storage compartment. The respective recesses of the top 101 and bottom shells 102 can comprise the same or different thicknesses.

The wallet 100 thickness is a sum of the thickness of the material of the top 101 and bottom shells 102, the recess 106, and the thickness of any optional money clip 103. Accordingly, each of these variables can be adjusted to control the overall thickness of the wallet.

A recess 106 offers several advantages. If the shells 101, 102 were simply flat with no recess, they would simply be two flat pieces pressed together. Such an embodiment cannot securely hold the wallet's contents, much of which is often valuable, confidential, and important. The recess 106 provides for a secure storage compartment in which to store these valuable items.

In one embodiment the wallet 100 is taller and wider than a common credit card. In one embodiment the wallet has a width of between about 2 and 2.5 inches. In one embodiment the height ranges between about 3.5 and 4.5 inches. The extra length and width allows the wallet to completely surround and encase its contents, increasing the security. In one embodiment, and as depicted, the bottom shell 102, for example, extends upward and outward from the recess. As can be seen in FIG. 1, the bottom shell 102 extends outward at between about a 30-60° angle relative to the flat planar portion of the recess 106. The angle can be adjusted depending on the desired thickness of the wallet 100 and the thickness of the recess 106. As depicted, both the top 101 and bottom shells 102 comprise an angle such that the edges where they meet offer a thinner thickness. This thinner edge allows the wallet 100 to be more easily directed into a user's pocket, for example. Further, the thinner edge offers a sleeker, more aesthetically pleasing appearance. Finally, because of the angled wall portion of the shells 101, 102, the shells fully encase the wallet's content.

Figure 4:
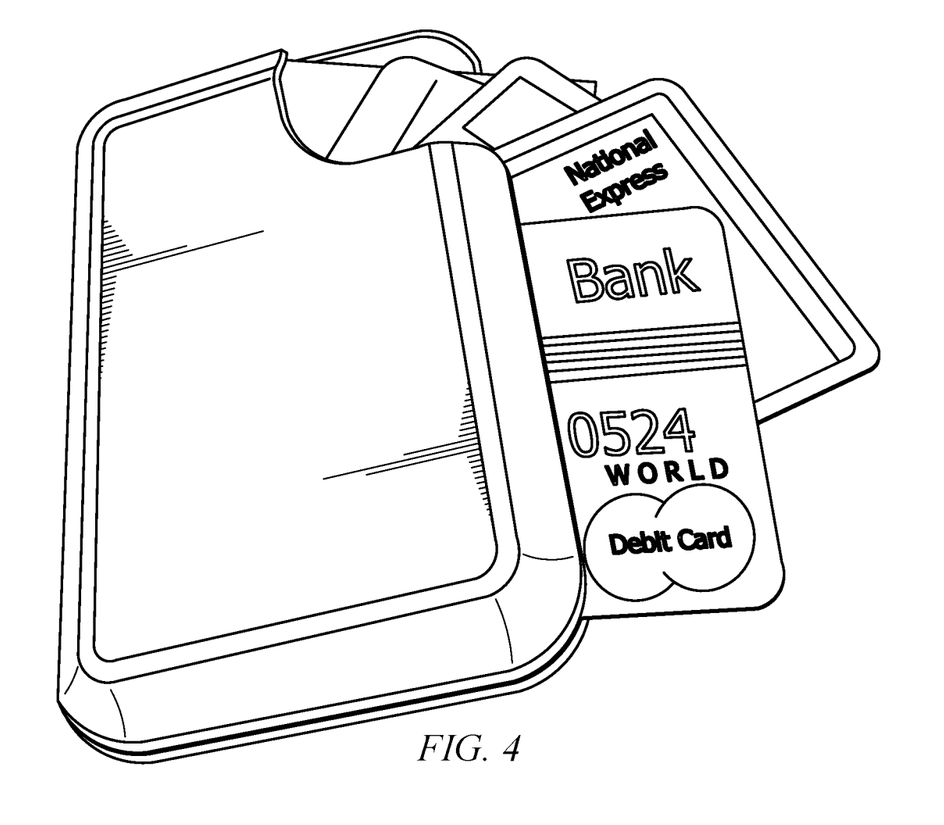
FIG. 4 is a top perspective view of a wallet with cards in one embodiment.

FIG. 4 is a top perspective view of a wallet with cards in one embodiment. As can be seen, the contents of the wallet 100 can be spread out in a fan-like shape. This allows the user to view several different cards and choose the desired card. In traditional wallets the user had to retrieve all of the cards from the wallet, sort through them, and decide which card to use. Often a user has a business card, a personal card, a debit card, a driver's license, etc. Having to remove all of the cards and sort through them is inefficient and undesirable as this provides an opportunity to lose contents. The fanned embodiment in FIG. 4 illustrates that several cards or items can be viewed at one time, allowing the user to select only the desired card. In one embodiment, to achieve the fanned embodiment, the user presses upon the card through the window 104 and swipes in the direction of the fan. The pressure causes the other cards to spread out as depicted. The user can then select the desired card, and swipe in the opposite direction to return the contents into the wallet.

The shell hinge 107 provides sufficient pressure upon the contents to allow the contents to be fanned out yet remain under the control of the wallet 100. The pressure of the shell hinge 107 allows the wallet's contents, such as cards, to be pivoted at the lower left corner. This provides the unexpected advantage of allowing the user to visualize and select his or her cards without having to remove all of the cards. Another advantage is that because the cards are under constant pressure, the cards do not fall from the wallet. Compared to removing all of the cards and sorting all cards by hand, the wallet discussed increases security of the cards or contents within the wallet.

As noted, the shell hinge 107 and the set-shape of the wallet 100 ensure that the top shell 101 tries to keep its shape adjacent to the bottom shell 102. In some embodiments the top shell 101 is touching the bottom shell 102 at the clamped edges, whereas in other embodiments they are not physically touching but are very close to one another. This ensures the contents of the wallet is encased within the wallet. In one embodiment, all four side-edges of the contents are secured by either a sealed edge or a clamped edge. For example, if a credit card is inserted into the recess, the shell hinge 107 acts a sealed edge secures the left side-edge, the top clamped edge at the intersection of the top shell 101 and the bottom shell 102 covers the top side-edge of the card, the bottom clamped edge at the intersection of the top shell 101 and the bottom shell 102 covers the bottom side-edge of the card, and the right clamped edge at the intersection of the top shell 101 and the bottom shell 102 covers the right side-edge of the card. Thus, all four sides of the card are secured. This is contracted to a traditional money-clip wallet wherein the top, for example, is open. An open side is a side which is not either clamped or sealed. In wallets with an open top, for example, the wallet expands and stretches to accommodate additional cards. When cards are removed for cleaning the wallet, for example, the wallet has undesirably permanently stretched. When such a wallet is turned upside down, the cards can then fall through the open top end. In one embodiment comprising four secure sides, sealed or clamped, this problem is eliminated or reduced because there are no open sides. Thus, in one embodiment, the wallet 100 does not comprise an open side.

Returning to FIG. 1, the top shell 101 and the bottom shell 102 each comprise an exposed edge 105a,b, as depicted. The top shell 101 has three sides of exposed edges 105a: a top side, a right side, and a bottom side. The top shell 101 does not have an exposed edge on the left side because of the location of the shell hinge 107. The bottom shell 102, as depicted, also has exposed edges 105b on the top side, bottom side, and portions of the right side, but does not have an exposed edge on the left side because of the location of the shell hinge 107. In one embodiment the every exposed edge 105a, b is polished. As can be seen, and as previously discussed, the exposed edge 105a of the top shell 101 is adjacent to the exposed edge 105b of the bottom shell 102. As discussed, in some embodiments these edges are touching, whereas in other embodiments they are separated by a small distance.

In one embodiment the exposed edges 105a,b are polished. Polishing these edges 105a,b results in a smooth, and in one embodiment, shiny surface. A smooth surface prevents the wallet from becoming snagged on clothing, for example. Further, because a wallet is often worn close to the user's body, a smooth polished edge prevents injury such as scratching. Finally, a polished edge 105a,b is aesthetically pleasing and demonstrates a high level of craftsmanship.

The wallet discussed herein has several benefits. First, in one embodiment, the wallet is water proof or water resistant. As such, in one embodiment, the wallet will not retainer moisture. Instead, when immersed in water, the wallet's material stays dry. This is contrasted to, for example, leather wallets which retain moisture and remain wet when coming into contact with water. The user will have a soggy wallet for hours after getting wet. Further, the leather wallet will expand and contract in response to the moisture, causing the contents to spill from the wallet. However, a wallet comprising water proof or water resistant materials, such as Kydex, the wallet will not remain wet. Further, because the wallet material, in one embodiment, does not expand or contract with moisture, the contents remain secure within the wallet. A surfer, for example, can surf with the wallet in his or her pocket, and the wallet's contents will remain secure within the wallet. Further, when the surfer gets out of the water, any water will drain away from the wallet.

Second, a wallet comprising moldable material, such as a thermoplastic material is far more durable compared to standard leather wallets, for example. Many materials, such as Kydex, are very tough and are difficult to scuff or scratch. A wallet comprising thermoplastic material can be stored next to metallic objects such as tools, and will not easily scratch or wear.

Third, because of the memory shape properties of the moldable material, such as a thermoplastic material, the material maintains its set shape far better than leather or other similar materials. As discussed above, when additional contents are placed in a leather wallet, for example, the leather stretches to accommodate the contents. When some contents are removed, the leather remains stretched resulting in the contents falling from the wallet. Because a thermoplastic material better maintains its shape, this problem is eliminated or reduced.

Fourth, as described above, in certain embodiments the wallet comprises a window. The window allows some of the wallet's contents to be viewed from the outside of the wallet. Additionally, the window allows the wallet's contents to be manipulated.

Fifth, in certain embodiments the wallet allows a fanned shape embodiment wherein several cards are spread out in a fan like shape while still being controlled under the pressure of the wallet. This allows a user to see and select a desired card from many cards. Further, such an embodiment reduces the likelihood that a card or other content will become lost while the user sorts through a pile of contents.

Figures 5, 6:
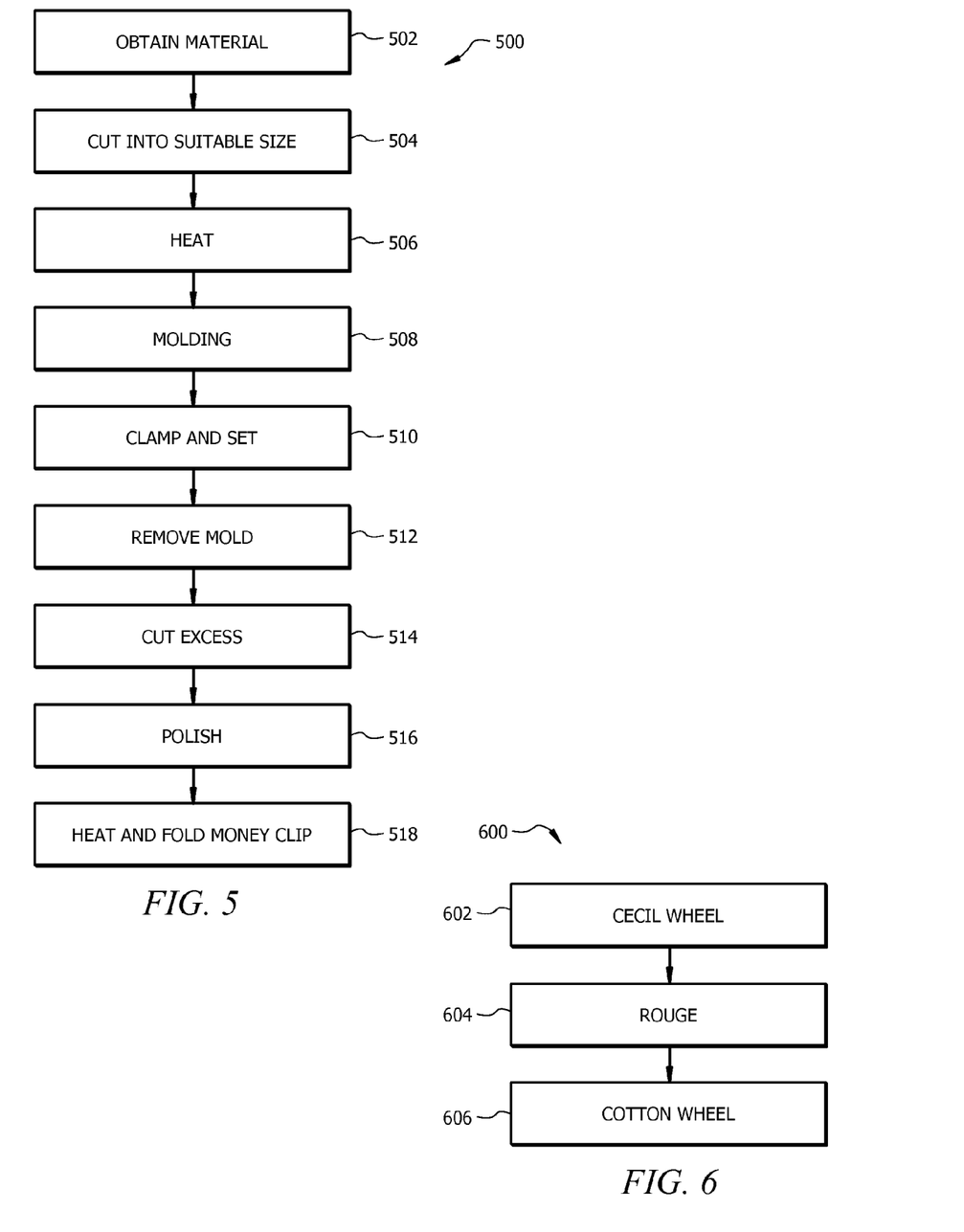
FIG. 5 is a flow chart of the method of manufacturing in one embodiment.
FIG. 6 is a flow chart of the polishing step in one embodiment.

While a wallet has been described, one method of making the wallet will also be described. FIG. 5 is a flow chart of the method of manufacturing the wallet in one embodiment. FIG. 5 begins with the step of obtaining material. As discussed above, the material can comprise any thermoplastic material. In one embodiment the material comprises sheets of material. In one embodiment the sheets measure about 4 feet by 8 feet in size. The thickness of the sheet can vary depending upon the desired thickness of the wallet. In one embodiment the sheets comprise a thickness of about 0.080 inches. In another embodiment the sheets have a thickness of about 0.093 inches.

Next, the sheets are cut into sizes suitable for handling. The specific size is dependent upon the desired size of the wallet. In one embodiment the sizes ranges from about 6 inches to about 12 inches in length and from about 3 inches to about 8 inches wide. In one embodiment the size is about 9 inches long by about 5 inches wide. Virtually any method can be used for cutting. In one embodiment the sheets are scored with a razor knife. Once scored, the sheets can be snapped into the specified sizes.

Next, the material heated. Heating a moldable material, such as a thermoplastic material makes the material bendable and moldable. The specific temperature required for heating a specific moldable material will depend upon the moldable material. In one embodiment using Kydex, the Kydex is heated between about 305° F. to about 350° F., whereas in other embodiments it is heated between about 330° F. to about 350° F. For Kydex, a higher temperature results in crisper, better defined lines. However, a lower temperature results in higher throughput.

The heating can be accomplished on virtually any tool used to heat a material. These include ovens, pizza ovens, t-shirt presses, irons, and virtually any device which supplies heat. In one embodiment, a t-shirt press is utilized. With such a tool, the material is placed within the press, and when the top is closed, the material is sandwiched within the press. The heating time is dependent upon material type, material thickness, and desired temperature. In one embodiment utilizing Kydex a temperature of 350° F. can be reached in 55 seconds. A pizza oven typically requires about 6 minutes from room temperature.

After the heating step, the heated material is molded. In one embodiment the material is wrapped around a mold comprising the shape of the recess. In one embodiment, the mold comprises angled ends which provide the angled edges.

In one embodiment the mold is coated with a non-stick surface to keep the wallet material from adhering to the mold. In one embodiment the mold comprises Formica, although any rigid material, including but not limited to particle board, aluminum and other metals, etc., can be used.

The wallet is placed around the mold. Thereafter, the molded wallet is allowed to sit for a period of time. The sitting time is dependent upon the moldable material, but in one embodiment comprising Kydex the mold is allowed to sit for between about 3 to 6 minutes. In one embodiment the wallet is clamped to the mold. The wallet material, including Kydex in one embodiment, expands and contracts in response to heat. Thus, the clamping resists this expansion or retraction and maintains the desired shape. Virtually any type of clamps can be used. In one embodiment the material is clamped to 600 pounds force.

In one embodiment an air cooled press is utilized. An air cooled press decreases the time necessary to cool and set the molded wallet. In one embodiment an air cooled press reduces the cooling time from about 6 minutes to about 2.5 to 3 minutes. Such a reduction in time allows additional throughput.

After sitting for the desired time, the mold is removed. In one embodiment the mold is removed by separating the top shell 101 from the bottom shell 102.

After removing the mold, any excess material is cut and removed. Thus, if an undesirable flap extended from the top shell 101, this is cut and removed. Likewise, in one embodiment material is removed to form a window 104. The material can be cut using any method discussed herein. In one embodiment a band saw or a scroll saw is used to cut the excess. In one embodiment, cutting the excess comprises using a saw to cut beyond the desired final lines. Thereafter, a grinder is used to form the desired line.

After cutting the excess material, in one embodiment, the wallet is polished in a polishing step 516. Virtually any method of polishing can be utilized. FIG. 6 is a flow chart of the polishing step in one embodiment. As depicted, in one embodiment the first step of polishing is utilizing a cecil wheel 602. A cecil wheel 602 offers a finer grinding surface. In this step, the cecil wheel 602 prepares a smooth surface on the outer edges of the wallet.

After the cecil wheel 602, in one embodiment is a rouge step 604. Virtually any rouge can be utilized. In one embodiment a polishing rouge called Emory is utilized. A rouge micro-emulsifies the surface of the material and disperses the heat evenly. In so doing, the rouge helps prevent clumping, creating a smooth surface.

The rouge can be applied with virtually any applicator known in the art. In one embodiment, the rouge is applied with a denim wheel.

After the roughing step 604, in one embodiment, is the cotton wheel step 606. A cotton wheel takes off the rouge, polishes the material, and makes the material shiny. The cotton wheel step 606 acts as the buffing step.

Referring back to FIG. 5, in one embodiment the polishing step 516 takes place prior to heating and folding the money clip 518. The reason for this is the money clip is still jetting away from the body of the wallet. As such, the edges of the money clip are more readily accessible for the polishing step than if the money clip had already been folded. The money clip is folded by applying localized heat via any device known in the art. In one embodiment a commercial heating gun is used to apply localized heat. The money clip, depending upon the material utilized, in one embodiment is heated to a temperature of between about 200-250° F. Thereafter, the money clip is folded to its desired shape and location.

In one embodiment the wallet further comprises radio frequency identification ("RFID") protection. Many modern credit cards have RFID chips, making them susceptible to being hacked and stolen from afar. Hackers can send signals to read the RFID credit cards, stealing the information, even when the credit cards are in the user's wallet. RFID protection offers a protective coating which shields the credit cards from hackers. Accordingly, in one embodiment, the wallet comprises RFID protection. In one embodiment, the wallet comprises RFID paper located on either the exterior or interior walls. The RFID paper can be installed with any method known in the art. As but one limiting example, in one embodiment RFID paper is secured to the inner, card-side, face of the wallet. In one example, a sandwiched layer of double sided tape located atop a layer of foil, located atop a layer of double sided tape, located atop a layer of RFID paper is utilized. The top layer of double sided tape is adhered to the interior surface of the wallet such that the RFID paper is adjacent the wallet's contents, such as credit cards. This is but one example of an RFID installation.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A wallet comprising:
  a clam shell shape with a top shell coupled to a bottom shell by a shell hinge;
  wherein the wallet comprises a sealed side located at the shell hinge, and a clamped top side, right side, and bottom side;
  wherein said top shell and said bottom shell comprises a moldable material.

Clause 2. The wallet of any proceeding or preceding clause wherein the top shell comprises edges, wherein the bottom shell comprises edges, and wherein the edges are polished.

Clause 3. The wallet of any proceeding or preceding clause wherein said moldable material comprises a thermoplastic material.

Clause 4. The wallet of any proceeding or preceding clause wherein said top shell comprises a window.

Clause 5. The wallet of any proceeding or preceding clause wherein said top shell, said bottom shell, and said shell hinge comprise one integral piece.

Clause 6. The wallet of any proceeding or preceding clause further comprising a money clip, wherein said money clip is coupled to said bottom shell.

Clause 7. The wallet of any proceeding or preceding clause wherein said money clip is integrally made with the top shell and the bottom shell.

Clause 8. The wallet of any proceeding or preceding clause wherein the bottom shell and the top shell each comprise a recess.

Clause 9. The wallet of any proceeding or preceding clause wherein the top shell comprises a flat planar surface, a top angled side, a right angled side, and a bottom angled side.

Clause 10. The wallet of any proceeding or preceding clause wherein the bottom shell comprises a flat planar surface, a top angled side, a right angled side, and a bottom angled side.

Clause 11. The wallet of any proceeding or preceding clause wherein said wallet does not comprise an open side.

Clause 12. The wallet of any proceeding or preceding clause wherein said moldable material comprises Kydex.

Clause 13. The wallet of any proceeding or preceding clause further comprising RFID protection.

Clause 14. A method of making a wallet, said wallet comprising:
  a clam shell shape with a top shell coupled to a bottom shell by a shell hinge;
  wherein the wallet comprises a sealed side located at the shell hinge, and a clamped top side, right side, and bottom side;
  wherein said top shell and said bottom shell comprise a moldable material;
  wherein the method comprises the steps of:

a) obtaining a sheet of moldable material;
b) heating the sheet of material to form a heated material;
c) molding the heated material into a desired shape to form a molded piece;
d) cutting excess material from the molded piece;
e) polishing the molded piece to form a wallet.

Clause 15. The method of any proceeding or preceding clause wherein said heating comprises heating between about 330° F. to about 350° F.

Clause 16. The method of any proceeding or preceding clause wherein said moldable material comprises a thermoplastic material.

Clause 17. The method of any proceeding or preceding clause wherein said molding further comprises allowing the heated material to set for a period between about 3 and 6 minutes.

Clause 18. The method of any proceeding or preceding clause further comprising the step of removing the mold.

Clause 19. The method of any proceeding or preceding clause wherein said step of cutting excess material comprises creating a window in the top shell.

Clause 20. The method of any proceeding or preceding clause further comprising the step of heating and folding a strip on said bottom shell to form a money clip.

Clause 21. The method of any proceeding or preceding clause further wherein said polishing of step e) comprises using a cecil wheel, followed by a rouge step, followed by a cotton wheel.

I claim:

1. A wallet comprising:
a clam shell shape with a top shell coupled to a bottom shell by a shell hinge;
wherein the wallet comprises a sealed side located at the shell hinge, and a clamped top side, right side, and bottom side;
wherein said top shell and said bottom shell comprises a moldable material; and wherein said top shell, said bottom shell, and said shell hinge comprise one integral piece, and wherein said moldable material comprises acrylic-polyvinyl chloride.

2. The wallet of claim 1 wherein the top shell comprises edges, wherein the bottom shell comprises edges, and wherein the edges are polished.

3. The wallet of claim 1 wherein said moldable material comprises a thermoplastic material.

4. The wallet of claim 1 wherein said top shell comprises a window.

5. The wallet of claim 1 further comprising a money clip, wherein said money clip is coupled to said bottom shell.

6. The wallet of claim 5 wherein said money clip is integrally made with the top shell and the bottom shell.

7. The wallet of claim 1 wherein the bottom shell and the top shell each comprise a recess.

8. The wallet of claim 1 wherein the top shell comprises a flat planar surface, a top angled side, a right angled side, and a bottom angled side.

9. The wallet of claim 1 wherein the bottom shell comprises a flat planar surface, a top angled side, a right angled side, and a bottom angled side.

10. The wallet of claim 1 wherein said wallet does not comprise an open side.

11. The wallet of claim 1 further comprising RFID protection.

* * * * *